C. R. Jackson.
Vault Cover.
No. 520. Reissued Jan. 19, 1858.
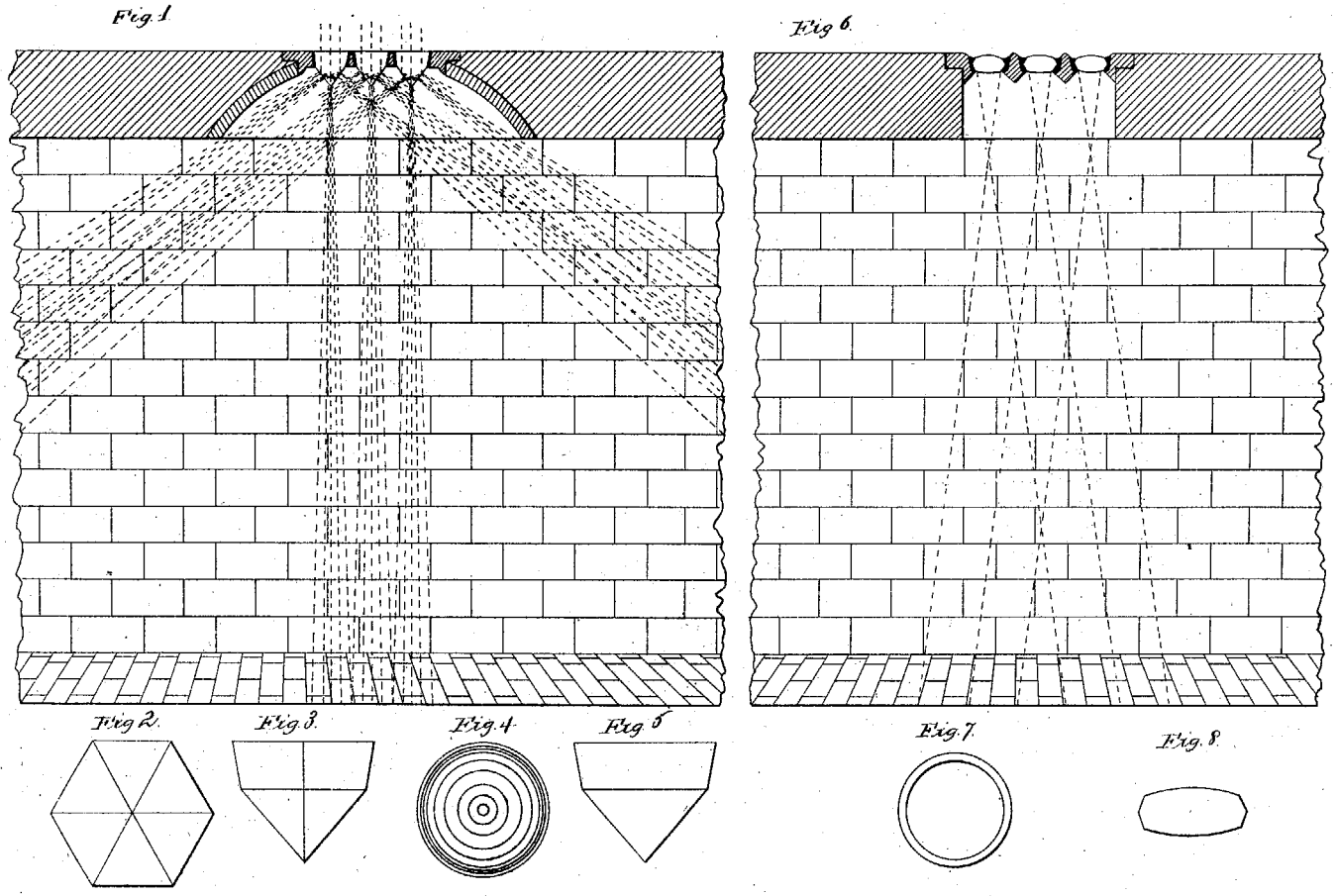
N. PETERS, PHOTO-LITHOGRAPHER, WASHINGTON, D. C.

UNITED STATES PATENT OFFICE.

GEORGE R. JACKSON, OF NEW YORK, N. Y.

IMPROVEMENT IN VAULT-COVERS.

Specification forming part of Letters Patent No. 17,096, dated April 21, 1857; Reissue No. 520, dated January 19, 1858.

*To all whom it may concern:*

Be it known that I, GEORGE R. JACKSON, of the city, county, and State of New York, (formerly of Rye, in the county of Westchester,) have invented a new and useful Improvement in Illuminating Vault-Covers, or other covers employed for admitting light from above into apartments; and I do hereby declare that the following is a full and exact description thereof, reference being had to the accompanying drawings, making a part of this specification.

My improvement in illuminating vault-covers consists in the peculiar shape of the glasses employed by me for closing the apertures in the metallic portion of said covers—viz., glasses of the form of an inverted pyramid or cone—which, by reflection and refraction, will laterally diffuse the descending rays of light uniformly throughout an apartment, and especially the upper portion thereof, substantially as represented in Figure 1 of the accompanying drawings.

It is perhaps hardly necessary for me to say that the rays of light, as they fall upon the inner faces of my improved vault-cover glasses, will be diverted from their vertical descent in the following manner, viz: A portion of the light will pass directly through the faces of said glasses in lines at right angles thereto, and a portion of the light will be reflected inward to the opposite faces of the glasses, and pass through the same in lines at right angles to those faces, all substantially as represented in Fig. 1.

To enable the diverging rays of light which descend through my improved vault-covers to pass freely into the apartments lighted thereby, the throats in the ceilings closed by said covers should be of a flaring shape.

I am aware that Thaddeus Hyatt uses glasses in the form of a lens in his patented vault-covers; and I am also aware that in his patent of March 27, 1855, he represents and describes a glass lens of the shape which he says he prefers for his vault-covers.

Figs. 7 and 8 of the accompanying drawings represent by a top and edge view the exact size and shape of Hyatt's glass lens above referred to, and Fig. 6 represents the direction taken by rays of light passing through a vault-cover supplied with that form of lens. An examination of this drawing cannot but satisfy any person of common intelligence that a ray of light passing through Hyatt's favorite lens is only refracted to such a degree as to turn it the distance of one foot from a vertical line in descending the distance of eight feet. It will therefore be perceived that the light must be very imperfectly distributed throughout apartments lighted by means of Hyatt's vault-covers; and should the glasses in said vault-covers be of a spherical shape the rays of light passing through said glasses would be refracted from vertical lines less than the distance of three feet during their descent to the bottom of the vault.

I am aware that a single-glass vault-cover was patented in 1834 by Edward Rockwell, and that the shape of the glass in said cover, as shown in Rockwell's patent, is nearly that of a plano-convex lens, the plane surface being uppermost.

The glass employed by Rockwell in his vault-cover aforesaid differs from that of an ordinary plano-convex lens simply in this, that its convex surface, instead of having a smooth exterior, has a series of narrow annular shoulders rising one above the other from base to apex, the shape of said shoulders being such that most of the rays of light passing through said glass will descend vertically to the bottom of the vault.

In the accompanying drawings, Figs. 2 and 3 represent by suitable views one of my improved vault-cover glasses of a polygonal shape, and Figs. 4 and 5 represent by similar views one of my improved vault cover glasses of a conical shape.

What I claim as my invention, and desire to secure by Letters Patent, is—

Combining glasses of an inverted pyramidal, polygonal, or conical form with the sash or metallic portion of an illuminating vault-cover, or its equivalent, for the purpose of producing a wide-spread and perfect diffusion of the rays of light which may pass through said cover into the apartment beneath, substantially as herein set forth.

The above specification of my new and useful improvement in illuminating-covers for openings in pavements, &c., signed and witnessed this 15th day of December, 1857.

GEO. R. JACKSON.

Witnesses:
EDWD. V. BURKE,
GEO. H. JACKSON.